(12) United States Patent
Meyer et al.

(10) Patent No.: US 8,436,772 B2
(45) Date of Patent: May 7, 2013

(54) DEVICE AND METHOD FOR ESTIMATING AN ORIENTATION OF A MOBILE TERMINAL DEVICE

(75) Inventors: Steffen Meyer, Erlangen (DE); Juergen Hupp, Nuremberg (DE); Stephan Haimerl, Seubersdorf (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 13/092,478

(22) Filed: Apr. 22, 2011

(65) Prior Publication Data

US 2011/0316748 A1   Dec. 29, 2011

Related U.S. Application Data

(63) Continuation of application No. PCT/EP2009/007418, filed on Oct. 15, 2009.

(30) Foreign Application Priority Data

Oct. 24, 2008   (DE) .......................... 10 2008 053 176

(51) Int. Cl.
    *G01S 3/02*   (2006.01)
(52) U.S. Cl.
    USPC ........................................... 342/451; 342/450
(58) Field of Classification Search .................. 342/450, 342/451, 463–465; 455/456.1, 456.6
    See application file for complete search history.

(56) References Cited

U.S. PATENT DOCUMENTS

| 6,839,560 B1 | 1/2005 | Bahl et al. |
| 7,783,302 B2 | 8/2010 | Hupp et al. |
| 2005/0040968 A1 | 2/2005 | Damarla et al. |
| 2010/0093368 A1 | 4/2010 | Meyer et al. |

FOREIGN PATENT DOCUMENTS

| DE | 102004035531 | 2/2006 |
| DE | 102007028114 | 9/2008 |
| EP | 1542492 A1 | 6/2005 |
| JP | 06021864 | 1/1994 |
| JP | 2005274363 | 10/2005 |

OTHER PUBLICATIONS

Bahl P et al: "RADAR: an in-building RF-based user location and tracking system"; Mar. 26-30, 2000; INFOCOM 2000, Nineteenth Annual Joint Conference of the IEEE Computer and Communications Societies. Proceedings, Piscataway, NJ, USA, vol. 2, pp. 775-784, XP010376167.
Translation of the Written Opinion, dated Feb. 26, 2010, in related PCT application No. PCT/EP2009/007418; 15 pages.

*Primary Examiner* — Dao Phan
(74) *Attorney, Agent, or Firm* — Michael A. Glenn; Glenn Patent Group

(57) ABSTRACT

A device for estimating a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time, with a determiner for determining an accordance measure between the current measurement package and a reference measurement package, which has a transmitter identification, a reference orientation and an electromagnetic signal characteristic of a reference radio transmitter which was receivable at a geographical reference position allocated to the reference measurement package with the reference orientation at a reference time lying before the current measurement time, a selector for selecting at least one reference measurement package which has an accordance measure, and a determiner for determining an estimate for the current orientation of the mobile terminal device based on the reference orientation of the at least one selected reference measurement package.

22 Claims, 9 Drawing Sheets

DEVICE AND METHOD FOR ESTIMATING AN ORIENTATION OF A MOBILE TERMINAL DEVICE

CROSS-REFERENCE TO RELATED APPLICATIONS

This application is Continuation of International Patent Application No. PCT/EP2009/007418 filed Oct. 15, 2009, and claims priority from German Patent Application No. 102008053176.6, which was filed on Oct. 24, 2008, and is incorporated herein in its entirety by reference.

BACKGROUND OF THE INVENTION

The present invention relates to devices and methods for estimating spatial orientations of mobile terminal devices, as they are used, in particular, for localizing or navigating the mobile terminal devices in a wireless communication network.

For a localization of mobile terminal devices, different localization technologies are available. The probably most common system for localization or navigation in the outdoor area is the satellite-supported global positioning system (GPS). For the localization or navigation within buildings or in an indoor area, different approaches are known, like, for example, infrared systems, HFID systems or also field-strength evaluations of IEEE 802.11 WLAN networks (wireless local area networks). The GPS system is currently only reliably available for the outdoor area. New expansions, like, for example, highly sensitive receivers or the so-called A-GPS (assisted GPS) represent approaches to make the technology also usable within buildings. A-GPS here combines the use of the satellite-based GPS system with a reception of so-called assistance information from cellular mobile radio networks. Currently, these technologies do not have the desired average accuracies. Infrared systems and HFID systems are generally not available everywhere and are bound to specific conditions.

Based on the increasing spread of wireless radio networks, for example based on the WLAN standard, these wireless networks offer themselves as a basis for new localization methods.

Conventional localization methods used hitherto are based, for example, on triangulation, neighborhood relationships, lateration by means of time measurement or lateration by means of field strength evaluation. These are localization methods, wherein either the position of stationary radio transmitters or base stations has to be known or wherein training has to be done beforehand at reference positions in an environment to be covered by the localization method.

With WLAN-based localization systems, often a so-called received signal strength (RSS) fingerprinting is used as a basic method. This method is based on the assumption that signal strengths of radio signals of several radio stations received or receivable at a certain location uniquely characterize the current location or the current position. If a reference database exists, containing, for a number of reference locations or reference positions, transmitter identifications of radio stations received or receivable there at reference times and the signal strengths of the corresponding radio signals, then from a set of current measurement values (transmitter identifications and associated signal strength values) the current position may be concluded by executing a matching between the currently measured measurement values and the reference values of the database. This matching evaluates, for each reference point, how similar the previously recorded measurement values or reference values are compared to the current measurement values of the current position. The one or several most similar reference points then form a basis for an estimate for the current location of the mobile terminal device.

For a reference database, by a reference measurement the signal strength of a radio transmitter receivable at a reference measurement time at a reference position is determined by experiment. From this, a database results containing, for each reference position at which a reference measurement was executed, a list of radio transmitters (access points) with the respectively associated receive field strength and quality. This list may also be referred to as a reference package. With a WLAN implementation, such a reference database may, for example, contain the following parameters:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

Here, the table contains the following information:
the reference position identification (RID)
the MAC addresses (MAC=media access control) of the received stations
the receive field strengths of the radio transmitters (RSSI (received signal strength indicator); 46560 means −46,560 dBm)
the reference position in Cartesian, metrical coordinates (x, y, z; 24583 means 245.83 m) and
the time of measurement value recording.

The column PGS ("percentage seen") indicates how often this station was seen in percent in measurement value recording (i.e. PGS=90 means that on average the station was measured in 9 out of 10 measurements).

In the above-illustrated table, any information associated with a reference position identification (RID) corresponds to a reference measurement package. I.e. the above-indicated exemplary table includes three reference measurement packages corresponding to three different geographical reference positions.

For the localization currently received radio transmitters with their respectively associated receive field strength (measurement package) are compared to reference packages from the reference database in a matching phase. A conventional distance formula often used in the matching phase is $$acc = \sum_{n=1}^{Neq} \Delta RSSI_n \quad (1)$$

and it is here assumed that all radio transmitters may be received everywhere. Here, acc refers to the accordance measure or the distance between the current measurement package and the reference package and $N_{eq}$ to a number of radio transmitters, wherein previously recorded transmitter identifications at the reference position are identical to transmitter identifications provided at the current position. Differences of RSSI values of radio transmitters, wherein previously recorded transmitter identifications at the reference position are identical to the transmitter identifications provided at the current position are referred to as $\Delta RSSI_n$ (n=1, ... $N_{eq}$). It is not in every case the case, however, that all radio transmitters may be received everywhere. If a reference package contains radio transmitters A, B and C, and a current measurement package contains the radio transmitters D, E, an (optimum) value 0 results as the distance. Apparently the reference package fits perfectly, although not one single radio transmitter matches between the reference and the current measurement package.

Thus, for practice, the calculation of the accordance or the distance may be varied such that in a current measurement package as compared to a reference measurement package too many or too few received radio transmitters increase the distance by a value which results, for example, from a malus function.

$$acc = \frac{EQW \cdot \sum_{n=1}^{Neq} \Delta RSSI_n( ) + (1 - EQW) \cdot \left( \sum_{m=1}^{N_{nh}} M_{nh,m}( ) + \sum_{r=1}^{N_{HTM}} M_{htm,r}( ) \right)}{N_{eq} + N_{nh} + N_{htm}} \quad (2)$$

Here, EQW designates a weight between 0 and 1 which indicates how highly the distance of the measurement values or the distance of the signal strength values $\Sigma \Delta RSSI_n$ at the current position is to be rated compared to the too many ($N_{nh}$) or too few ($N_{htm}$) radio transmitters received. For each radio transmitter which is missing in the reference values, but which is contained in the currently measured measurement values, a malus value $M_{htm,r}( )$ (r−1, ... , $N_{htm}$) may be defined. Likewise, for each radio transmitter which is contained in the references values but is missing in the currently measured measurement values, a malus value $M_{nh,m}( )$ (m−1, ... , $N_{nh}$) may be defined.

Reference packages with a small distance to the current measurement package, i.e. many common radio transmitters and few different receive field strengths, fit well into the current measurement package. The reference positions belonging to the well fitting reference packages are very probable and enter a position calculation phase. The position calculation phase calculates the position of the mobile terminal device from the candidate positions. The result of this phase is the position of the terminal device. One possible realization is the calculation of a weighted average value from the candidate positions of the matching phase. The inverse distance values here form the weights in the averaging. This method called k-weighted nearest neighbor provides respectable results, the average positioning error being a few meters.

If a user is holding a mobile terminal device, like, e.g., a PDA (personal digital assistant) in front of his body, radio signals of radio transmitters behind the user's body may be strongly attenuated. If the user is now, for example, close to a reference position for which a reference package exists in a reference database, the reference package is discarded as not very suitable due to the signal attenuation by the body, as the shadowed radio transmitters were not shadowed during calibration, or shadowed to a lesser extent, and thus the radio fingerprints are not a good match.

It may also happen that a mobile terminal device which was used for calibrating the reference packages comprises another antenna directional pattern or characteristic than the mobile terminal device used by a user for localizing or navigating. For this reason and in addition to the alignment of the mobile terminal device with the body, it may happen that reference packages of reference positions which actually match well are erroneously discarded and that a position estimation is thus adversely affected.

In addition, it may be of interest for some applications to obtain information about the orientation of the mobile terminal device to the body or the spatial orientation of the user and/or terminal device.

SUMMARY

According to an embodiment, a device for estimating a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time, may have a determiner for determining an accordance measure between the current measurement package and a reference measurement package having a transmitter identification, a reference orientation and an electromagnetic signal characteristic of a reference radio transmitter which was receivable at a geographical reference position associated with the reference measurement package with the reference orientation at a reference time lying before the current measurement time; a selector for selecting at least one reference measurement package having an accordance measure; and a determiner for determining an estimate for the current orientation of the mobile terminal device based on the reference orientation of the at least one selected reference measurement package.

According to another embodiment, a method for estimating a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time may have the steps of determining an accordance measure between the current measurement package and a reference measurement package having a transmitter identification, a reference orientation and an electromagnetic signal characteristic of a reference radio transmitter which was receivable at a geographical reference position associated with the reference measurement package with the reference orientation at a reference time lying before the current measurement time; selecting at least one reference measurement package having an accordance measure; and determining an estimate for the current orientation of the mobile terminal device based on the reference orientation of the at least one selected reference measurement package.

According to another embodiment, a computer program may execute the method for estimating a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time, which may have the steps of determining an accordance measure between the current measurement package and a reference measurement package having a transmitter identification, a reference orientation and an electromagnetic signal characteristic of a reference radio transmitter which was receivable at a geographical reference position associated with the reference measurement package with the reference orientation at a reference time lying before the current measurement time; selecting at least one reference measurement package having an accordance measure; and determining an estimate for the current orientation of the mobile terminal device based on the reference orientation of the at least one selected reference measurement package, when the computer program is executed on a computer or microcontroller.

According to another embodiment, a device for storing a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time may have a detector for detecting the current orientation; and a storage for storing the detected current orientation together with the determined measurement package in a reference database.

According to another embodiment, a method for storing a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time may have the steps of detecting the current orientation; and storing the detected current orientation together with the determined measurement package in a reference database.

According to another embodiment, a computer program may execute the method for storing a current orientation of a mobile terminal device at a current geographical position, wherein, at the current geographical position, a current measurement package may be determined which has a transmitter identification and an electromagnetic signal characteristic of a radio transmitter which may be received at the current geographical position with the current orientation of the mobile terminal device at a current measurement time which may have the steps of detecting the current orientation; and storing the detected current orientation together with the determined measurement package in a reference database, when the computer program is executed on a computer or microcontroller.

Embodiments of the present invention provide computer programs for executing the inventive methods.

The present invention is based on the finding that a navigation may be improved based on the fingerprinting method, by, in addition to the current position, additionally estimating orientation information which may, for example, give information to a user regarding in what spatial direction he is moving. In this respect, according to embodiments of the present invention, orientation information is allocated to each reference package. The orientation information indicates a spatial orientation of a mobile terminal device, using which the corresponding reference package was recorded. That means, it is stored in the reference package, for example, in what direction the mobile terminal device was held when the reference point was calibrated. This is of particular interest when the mobile terminal device, like, e.g., a WLAN-capable device, is held directly in front of the body of a user, so that shadowing effects may be caused by the body. Even without these mentioned body-related shadowing effects, additional orientation information may be advantageous as virtually every antenna comprises a directional characteristic. Thus, orientation may also be the spatial alignment of the main lobe of an antenna of a mobile terminal device.

The orientation information, for example regarding the four compass directions north (N), west (W), south (S), east (E) may help not only with regard to indicating the direction in a navigation, but may make a localization, i.e. a position determination of the mobile terminal device, more reliable. If, for example, during calibration for each reference point several reference packages are recorded for several orientations of the calibration device (e.g. N, W, S, E), then the four reference packages belonging to the reference position may be very different according to the four orientations due to body-related and directional characteristics-related signal attenuation. If, in a subsequent localization, a user holds his mobile terminal device for example at least approximately in the direction of one of the compass directions, respective reference packages may be found more reliably. Matching reference packages were then recorded at least approximately with the same spatial orientation as the current spatial orientation of the use or his mobile terminal device.

To deposit orientation information in or together with reference packages so that reference orientations results therefrom, embodiments of the present invention include a device for storing a current orientation of a mobile terminal device at a current geographical position, where, at the current geographical position, a current measurement package may be determined comprising a transmitter identification and an electromagnetic signal characteristic of a radio transmitter which may be received at the current geographical position with the current orientation of the mobile terminal device at a current measurement time. The device for storing comprises a means for detecting the current orientation of the mobile terminal device and a means for storing the detected current orientation together with the determined measurement package in a reference database.

The device for storing may, for example, be a special calibration box which is used for generating reference packages. Such a calibration box may comprise a more or less complicated means for detecting the current orientation. Compasses, GPS localizing devices and/or inertial sensorics for highly accurate position and orientation detection are possible in this case, for example. The orientation or the orientation information may be stored digitally and in a quantized way, so that for the orientation one or several digital values are stored in the storage of the database. As a possible storage format, for example complex numbers may be used, from which angles and/or orientations may be read. Thus, for north, e.g., a pair of numbers (0,1) according to the complex number 0+j ($j^2=-1$) may be used, for west, e.g., a pair of numbers (−1,0) according to the complex number −1+0j, for south, e.g., a pair of numbers (0,−1) according to the complex number 0−j, and for east, e.g., a pair of numbers (1,0) according to the complex number 1+0j may be stored.

According to other embodiments, the orientation may also be detected or estimated by a mobile terminal device or a client. A precondition is, however, reference orientations already existing in the reference database regarding reference packages or in reference packages. In this respect, embodiments of the present invention provide a device for estimating a current orientation of a mobile terminal device at a current geographical position, wherein at the current geographical position a current measurement package may be determined which comprises a transmitter identification and an electromagnetic signal characteristic of a radio transmitter which may be received at the current geographical position with the current orientation of the mobile terminal device at a current measurement time. The device for estimating comprises a means for determining an accordance measure (acc) between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time. Further, the device for estimating includes a means for selecting at least one reference measurement package, comprising at least one minimum accordance or matching, and a means for determining an estimate for the current orientation of the mobile terminal device based on the reference orientation of the at least one selected reference measurement package.

According to one embodiment, the at least one reference measurement package is selected such that its accordance measure does not deviate from a first reference accordance measure of a reference measurement package by more than a predetermined value, wherein the package has a highest accordance with regard to the current measurement package.

According to one embodiment, the means for determining an estimate value is adapted to determine the estimate based on a weighted sum of the reference orientations corresponding to the selected reference packages, wherein a weight of a reference orientation depends on an accordance measure determined for the reference measurement package.

Embodiments and implementations are part of the dependent claims.

Embodiments of the present invention enable, in a navigation based on RF fingerprinting, a directional indication which indicates in which direction a user is moving or in which direction a user is looking. From such orientation information, further information may be derived, like, e.g., directional instructions or also other information regarding objects in a potential visual field of the user, like, e.g., sights.

Further, embodiments of the present invention may serve to make a position determination of a mobile terminal device more reliable by making reference packages available which correspond better to the current orientation of a mobile terminal device or user and may thus lead to a better accordance in the matching phase.

BRIEF DESCRIPTION OF THE DRAWINGS

In the following, embodiments of the present invention will be explained in more detail with reference to the accompanying drawings, in which.

DETAILED DESCRIPTION OF THE INVENTION

Figure 1:
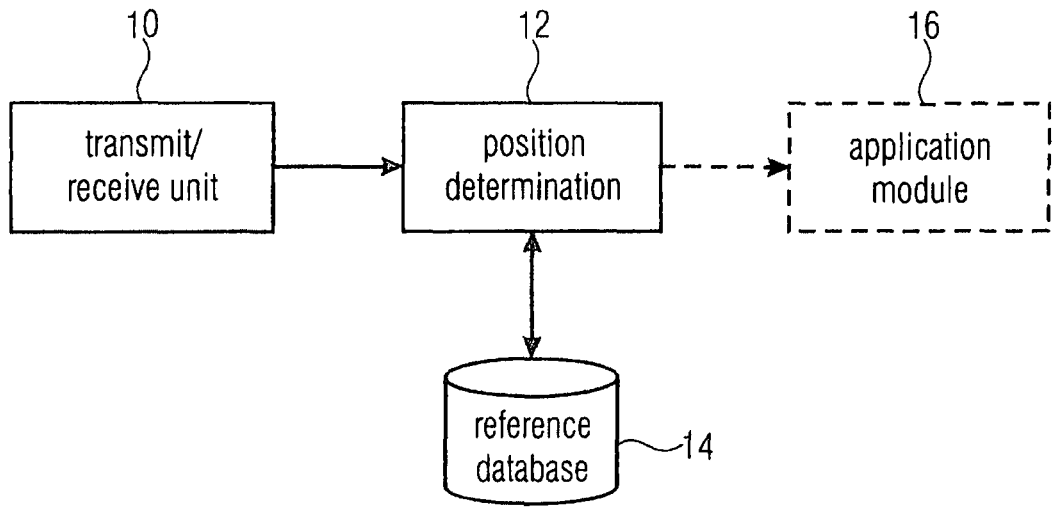
FIG. 1 is an embodiment of a device for localizing terminal devices according to conventional technology.
Figure 2:
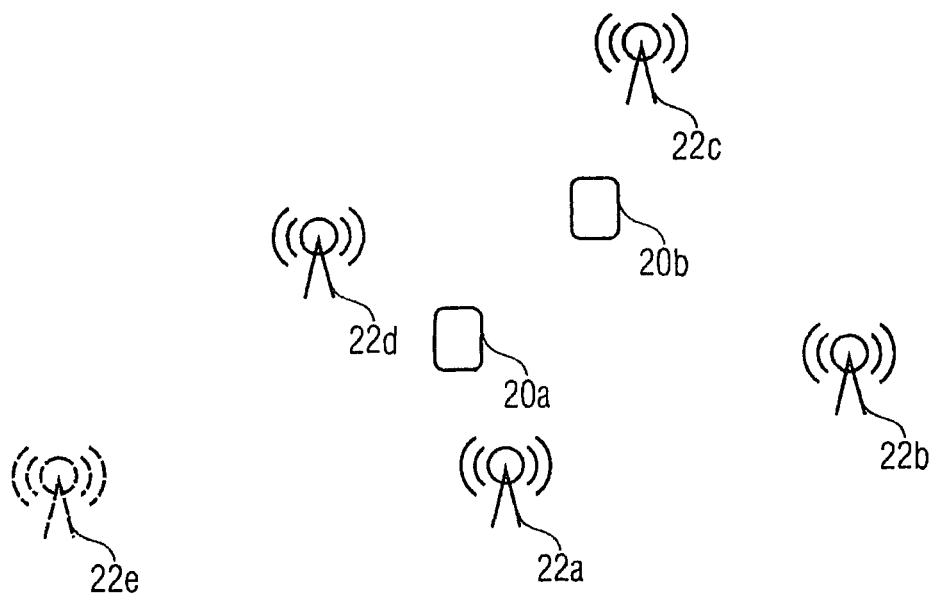
FIG. 2 is an example of an application of the method for localizing mobile terminal devices.

With reference to FIGS. 1 and 2, in the following first of all a localization according to the fingerprinting method will be described for motivating the inventive concept which is explained in more detail with reference to FIGS. 3 to 9.

Here, in particular the fact is considered that the increasing spread of non-public WLAN radio transmitters in many cities is meanwhile leading to a clear over-coverage. Often, 8 to 12 radio transmitters or stations (access points) may be received at one single position, wherein in the inner-city area the number of 30 receivable radio transmitters may even be exceeded (peak values in busy places or areas of high residential and population density).

For a relatively reliable and accurate localization, generally already three to four receivable radio transmitters are sufficient.

FIG. 1 illustrates how the localization of a mobile terminal device can be realized by means of fingerprinting (WLAN, GSM, BlueTooth, Wimax, etc.) in the public area as a self-localization of every individual mobile terminal device. Here, a data transmission is not necessary, so that in principle a connectivity of the mobile terminal device with other communication partners may be done without. This is possible, as the mobile terminal device calculates its own position by measuring current signal characteristics of its environment and matching the same to a (local) reference database.

For the illustration of the method, FIG. 1 shows a schematical illustration of a mobile terminal device which is able to carry out self-localization as an example. By a transmit/receive means 10, environmental information, like, for example, the number of access points located within the coverage range and their respective receive field strengths are determined. This environmental information is transmitted to a position determination means 12 which has further access to reference environmental information (reference measurement packages) which may be stored in a reference database 14.

Here, the reference database 14 may be stored both locally within the mobile terminal device and also non-locally on an external memory location or device. In the latter case, the mobile terminal device has, of course, to have access to the reference data for which at least one communication connection to the reference database 14 has to exist. The position determination means 12 uses a localizing algorithm to determine the current position of the terminal device based on the current measurement package and reference measurement packages. In this respect, first of all, in a matching phase, those reference measurement packages are determined which best match the current measurement package, i.e. whose similarity is greatest. Then, in a position calculation phase based on the determined similar reference measurement packages and their geographical reference positions, the current geographical position of the terminal device is determined. Once the current position has been determined, the same may optionally be provided to an application module 16, for example to indicate the position in a digital city map or to offer services which are in direct causal relation to the determined position (so-called location-based services).

Exemplarily, FIG. 2 shows an application scenario with two mobile terminal devices 20a and 20b and a plurality of communication partners or base stations 22a to 22e which are in the environment of the mobile terminal devices 20a and 20b. As environmental information, the mobile terminal devices 20a and 20b may, for example, determine the unique identification numbers of the radio transmitters or access points and the receive field strength associated with the respective radio transmitters. The radio transmitter 22e is located at the greatest distance from the mobile terminal devices 20a and 20b, so that the same may be received from the mobile terminal devices 20a and 20b at some times and at other times not, which may be caused by a shadowing of the base station 22e. In such a case the radio transmitter 22e may, in the above-described matching phase, for example, still be considered by a malus value when matching the current measurement package to the reference measurement package.

After reference packages which match the current measurement package, i.e. have a small distance value ace, have been found in the matching phase by means of equation (1) or equation (2), the thus found similar reference packages or their associated reference positions may be supplied to the position calculation phase. Here, as an estimate for the current position of the mobile terminal device, for example the reference position may be used belonging to the reference packages which matches best, i.e. to the reference package which has the smallest distance value acc. A weighted averaging of the coordinates of the possible reference positions is also possible, such that the respective coordinates of the reference positions are weighted with weights inversely proportional to the determined distance values.

Figure 3A:
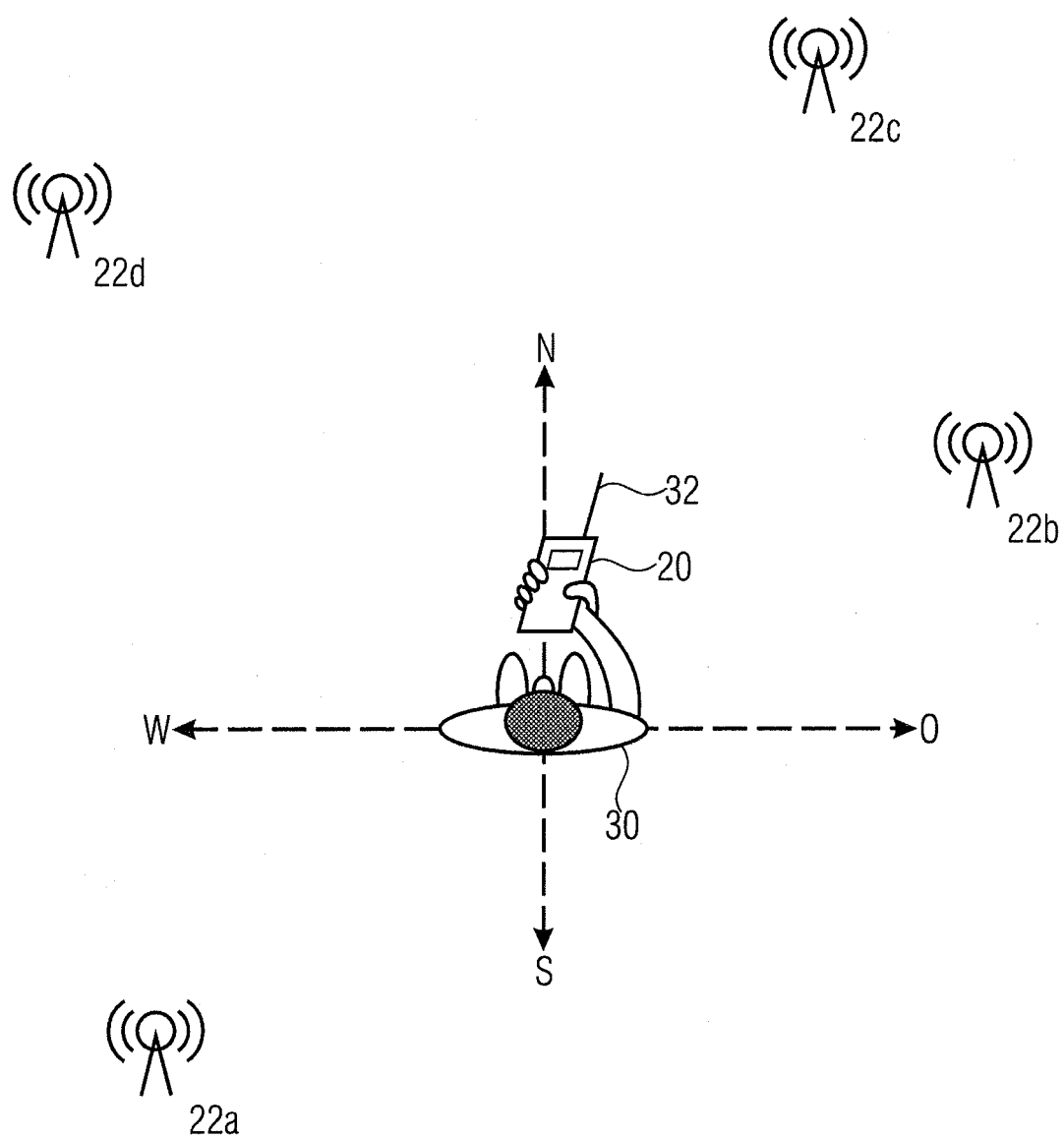
FIG. 3a is a schematical illustration of a user with a mobile terminal device directed to the north.

In addition to or as an alternative to the position determination, according to embodiments of the present invention also a spatial orientation of the mobile terminal device may be determined. A spatial orientation of a mobile terminal device results, for example, from how a user is holding a mobile terminal device. FIG. 3a shows a top view of a user 30 with a mobile terminal device 20 within a plurality of radio transmitters 22a to 22d.

In the scenario exemplarily shown in FIG. 3a, the user 30 is holding the mobile terminal device 20 at least approximately in the direction towards the north. In this manner, the user 30 attenuates the electromagnetic radiation coming from the radio transmitter 22a with his body, so that only a comparatively small part of the signal arrives at the mobile terminal device 20, which leads to a relatively low RSSI (received signal strength indicator) value with respect to the radio transmitter 22a. The radio transmitters 22b to 22d, on the contrary, are not or hardly shadowed by the body of the user 30, so that the same may be received relatively well with the exemplarily illustrated spatial orientation of the mobile terminal device 20.

For transmitting and/or receiving electromagnetic radiation, the mobile terminal device 20 comprises an antenna means 32 which may be part of the transmit/receive means 10. It is known that antenna means have a directional characteristic. Such an antenna directional characteristic generally comprises a so-called main lobe and several side lobes. The orientation of the mobile terminal device 20 may, for example, also be defined by a spatial orientation of the antenna main lobe, as is schematically illustrated in FIG. 3b.

Figure 3B:
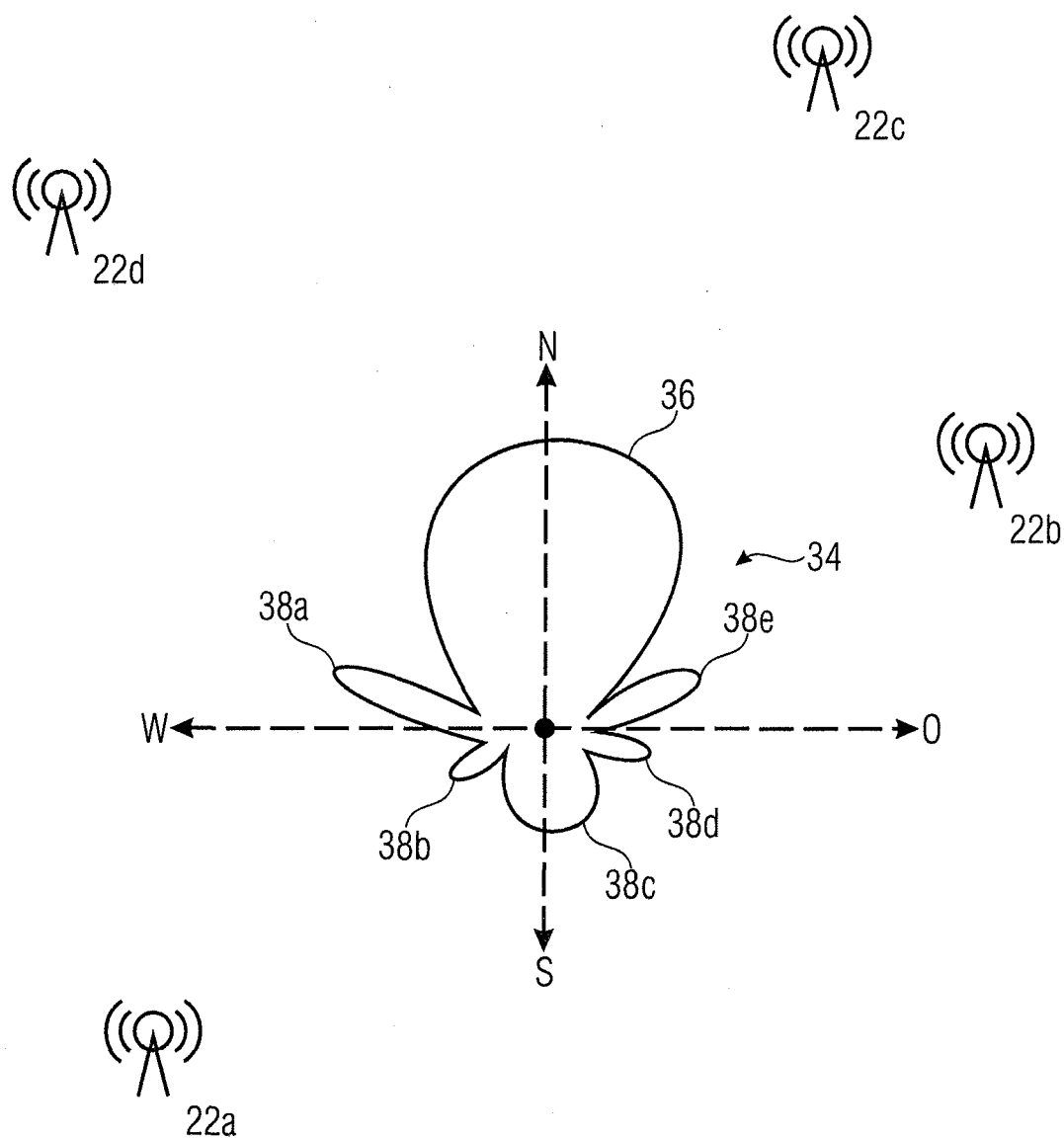
FIG. 3b is a, schematical illustration of a mobile terminal device whose antenna means comprises an antenna characteristic with a specific orientation.

FIG. 3b shows a schematical antenna characteristic 34 with a main lobe 36 and different side lobes 38a to 38e. In the illustrated scenario, the main lobe 36 approximately points in the direction of north, which may be equivalent to the orientation of the mobile terminal device.

It is obvious to a person skilled in the art when looking at FIGS. 3a and 3b that, considering different orientations already when calibrating reference packages may lead to improvements in a subsequent position determination. In this respect, when calibrating or training with respect to reference positions, reference measurement packages have to be recorded with different orientations. For example, in this respect the orientation of a mobile terminal device may be varied at a geographical reference position without changing the geographical reference position itself. That means, after recording a measurement package at the reference position with a reference orientation directing towards the north, still further reference packages may be recorded at the reference position with reference orientations directing to other compass directions. For example, two opposing (180° difference) directions are sensible or three different directions differing by 120°. As already described above, the four basic compass directions N, W, S, E are, of course, also possible.

Figure 4:
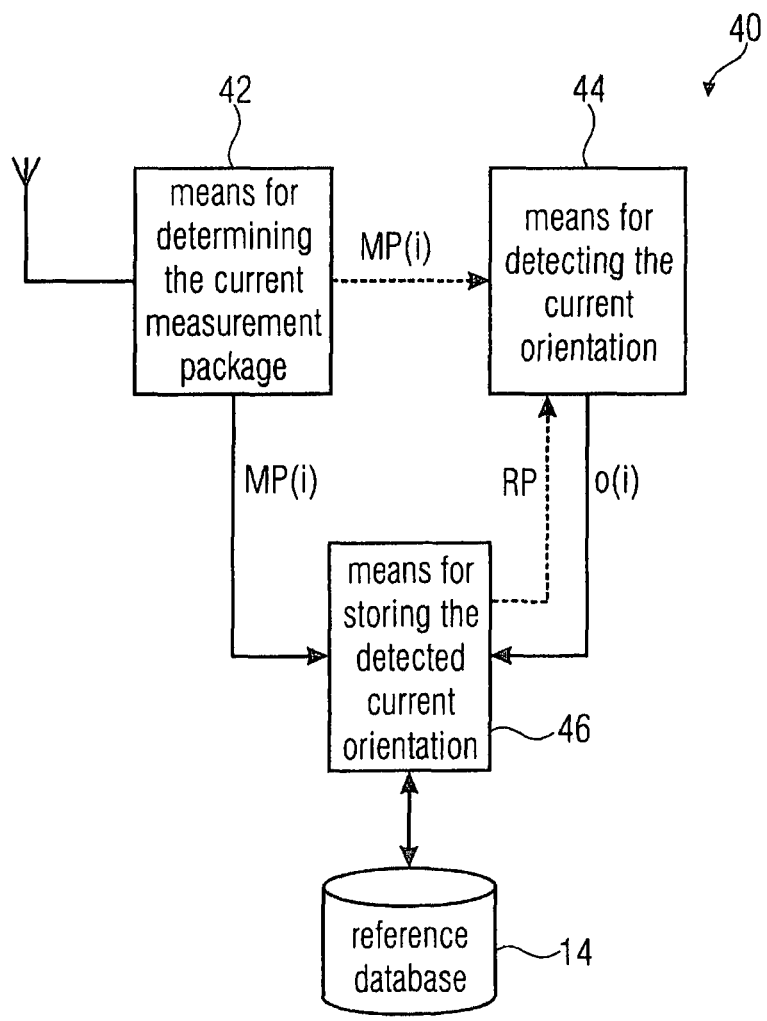
FIG. 4 is a schematical block diagram of a device for storing a current orientation according to an embodiment of the present invention.

In this respect, FIG. 4 schematically shows a device for storing a current spatial orientation or direction of a mobile terminal device at a current geographical position, wherein at the current geographical position a current measurement package MP(i) may be determined, which comprises a transmitter identification and an electromagnetic signal characteristic (e.g. RSSI value) of a radio transmitter which may be received at the current geographical position with the current orientation of the mobile terminal device at a current measurement time i.

In this respect, the device 40 comprises a means 42 for determining the current measurement package MP(i). Further, the device 40 comprises a means 44 for detecting the current orientation o(i) of the mobile terminal device. One means 46 serves for storing the detected current orientation o(i) together with the determined measurement package MP(i) in a reference database 14.

The means 42 for determining the measurement package MP(i) includes the transmit/receive unit 10 of the mobile terminal device. Using the same, transmitter identifications, like, e.g., MAC addresses, and associated receive field strength values are determined which are combined into the current measurement package MP(i). The current measurement package MP(i) may optionally be transmitted to the means 44 for detecting the current orientation. This is the case when in the means 44 the current orientation o(i) is determined based on the current measurement package MP(i) and the reference packages RP from the reference database 14. This is to be explained in more detail in the following.

The device 40 in this respect comprises a means 42 for determining the current measurement package MP(i). Further, the device 40 comprises a means 44 for detecting the current orientation o(i) of the mobile terminal device. A means 46 serves for storing the detected current orientation o(i) together with the determined measurement package MP(i) in a reference database 14.

According to other embodiments, the means 44 for detecting the current orientation o(i) may also be, for example, a conventional compass and/or a GPS localization device and/or inertial sensorics to determine the current spatial orientation o(i) and possibly the current geographical position of the mobile terminal device. For generating a new reference package the current measurement package MP(i) is stored together with the current orientation o(i) and the current position of the mobile terminal device in the reference database 14. This is schematically illustrated in FIG. 5.

Figure 5:
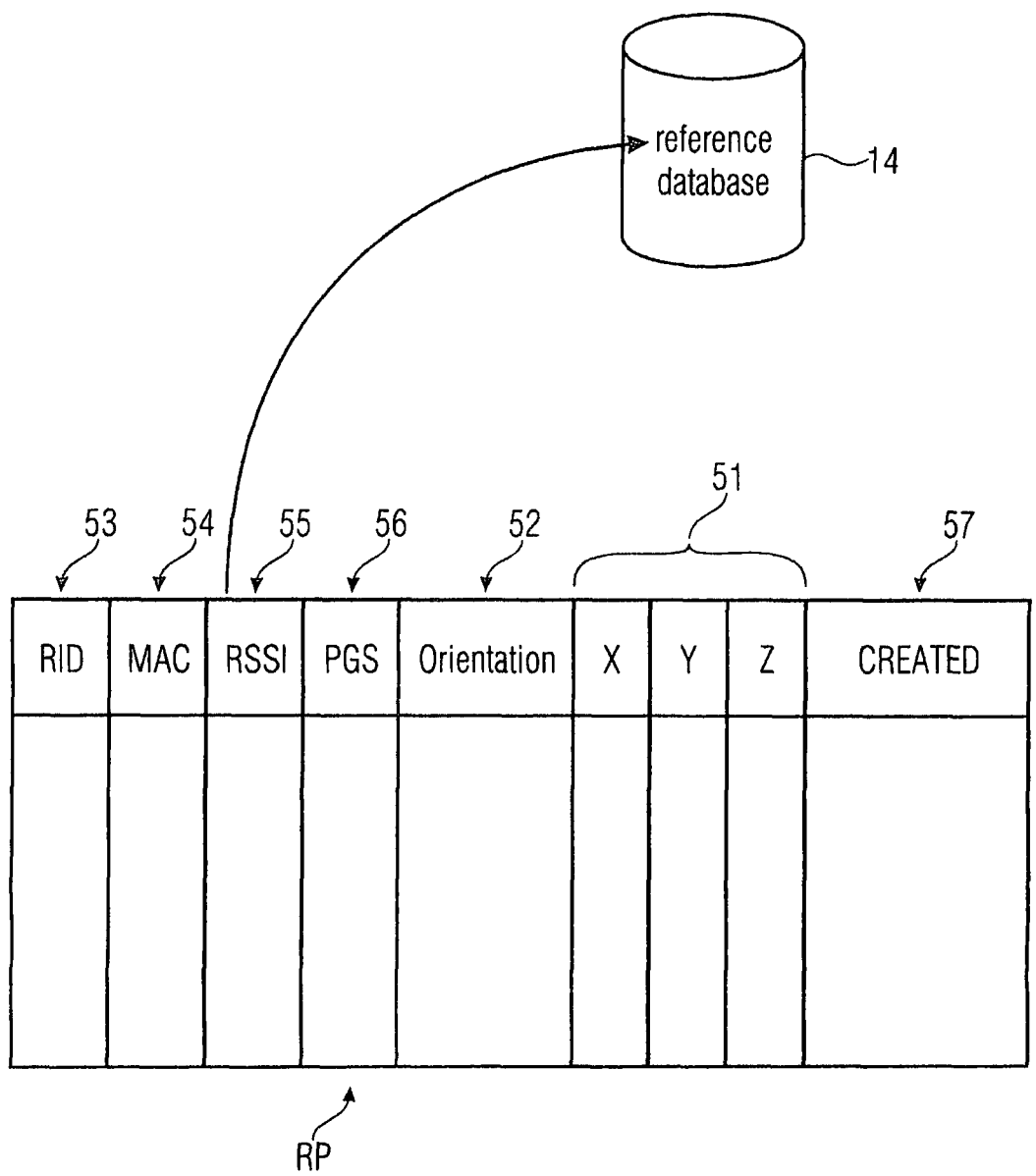
FIG. 5 is a schematical illustration of a reference package stored in a reference database.

FIG. 5 schematically illustrates a (newly generated) reference package RP which is stored in the reference database 14. Here, the new reference package RP may be generated by the inventive device 40 illustrated in FIG. 4. The reference package RP for a specific reference position here initially includes the coordinates (x,y,z) of the new reference position. Further, the reference package RP includes orientation information 52, i.e. information about the orientation of the mobile terminal device in the measurement value recording. Further, a reference point identification 53, MAC addresses 54 of received radio transmitters, corresponding RSSI values 55, PGS values 56, and measurement times 57 may be stored in the reference package RP, as was already described above. It is decisive here that an orientation 52 of the mobile terminal device is allocated to each reference package in the measurement value recording.

Figure 6:
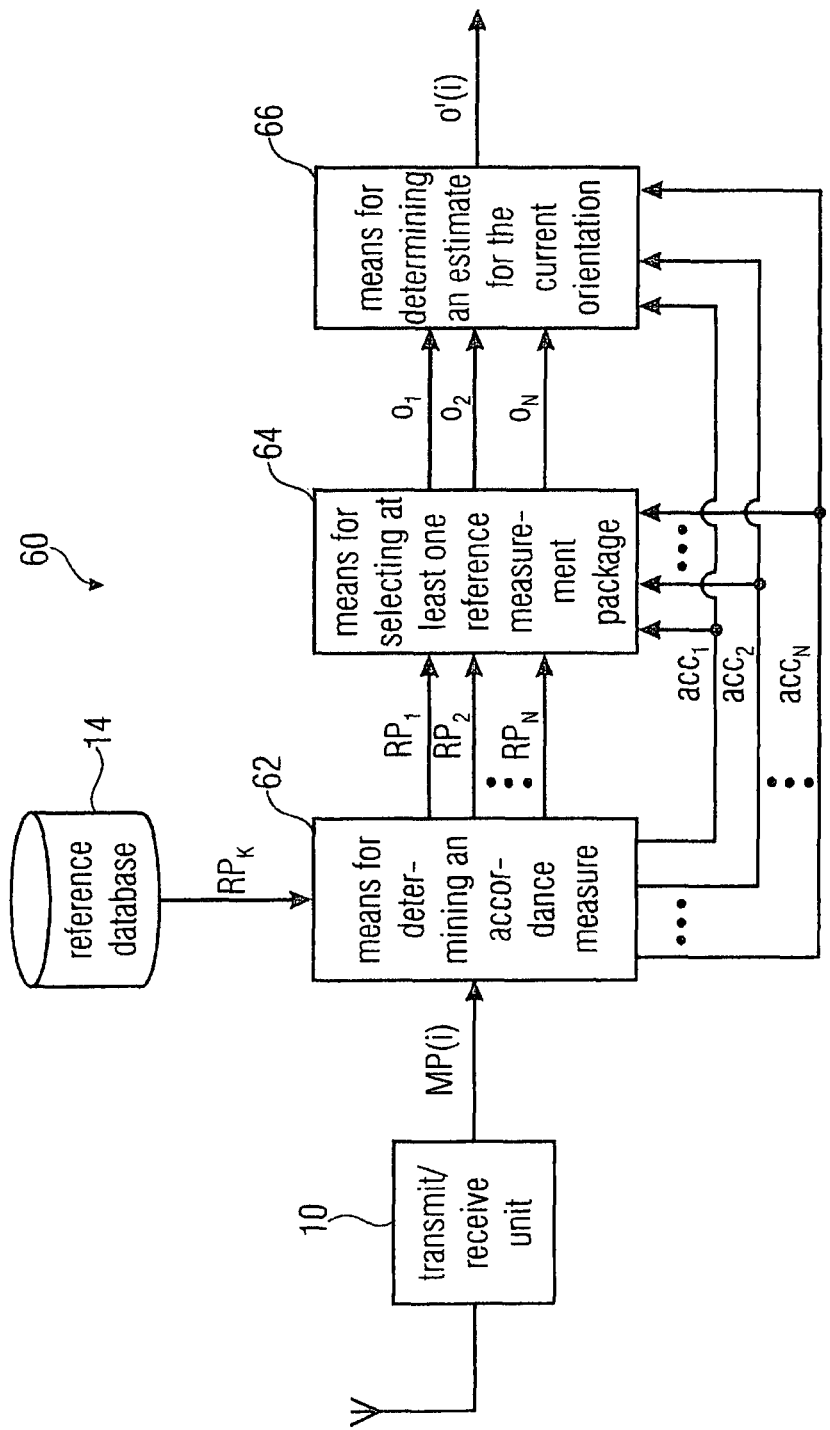
FIG. 6 is a schematical illustration of a device for estimating a current orientation of a mobile terminal device according to an embodiment of the present invention.
Figure 7:
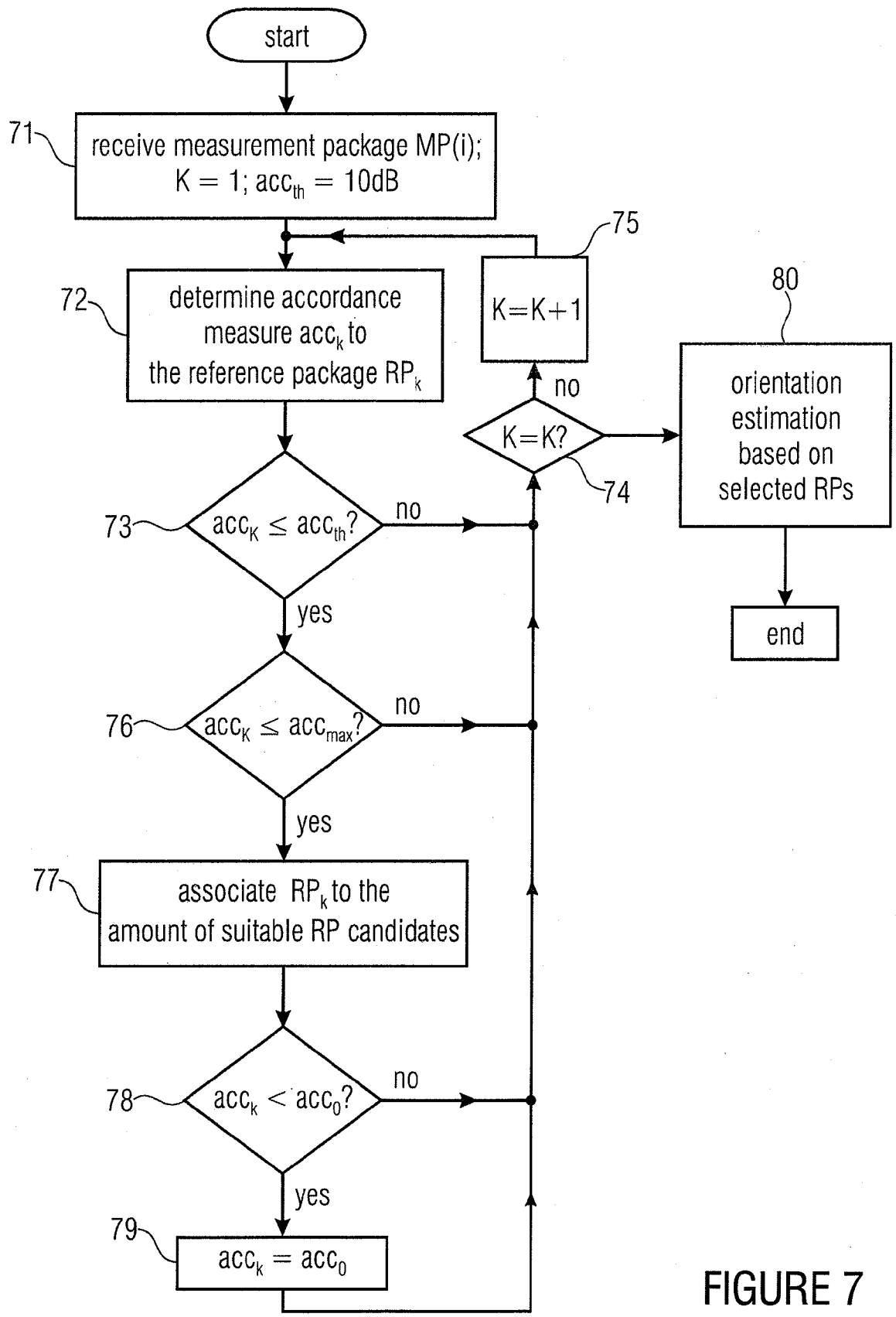
FIG. 7 is a flowchart of a method of estimating a current orientation of a mobile terminal device according to an embodiment of the present invention.

After orientation information has been deposited in a reference database 14, according to the above-described concept, it is possible using mobile terminal devices according to embodiments of the present invention that the same determine or estimate their spatial orientation in their environment themselves. In this respect, FIG. 6 schematically illustrates a device 60 for estimating a current orientation o(i) of a mobile terminal device. At a current geographical position, a current measurement package MP(i) may be determined which comprises a transmitter identification and an electromagnetic signal characteristic (e.g. RSSI value, receive power spectrum, signal-to-noise power ratio, etc.) of a radio transmitter which may be received at the current geographical positions with the current orientation of the mobile terminal device at a current measurement time.

The device 60, apart from a transmit/receive means 10, comprises a means 62 for determining an accordance measure $acc_k$ (k=1, 2, . . . ) between the current measurement package MP(i) and a reference measurement package $RP_k$ (k=1, 2, . . . ) which comprises a transmitter identification, a reference orientation $o_k$ and an electromagnetic signal characteristic of a reference radio transmitter which was receivable at a geographical position associated with the reference measurement package $RP_k$ with the reference orientation $o_k$ at a reference time lying before the current measurement time i. The means 62 is coupled to a means 64 for selecting at least one reference measurement package $RP_n$ (n=1, 2, . . . N; N≧1), which comprises an accordance measure $acc_n$ fulfilling certain criteria. On the output side, the means 64 is coupled to a means 66 for determining an estimate o'(i) for the current orientation o(i) of the mobile terminal device based on the reference orientation $o_n$ (n=1, 2, . . . N; N≧1) of the at least one selected reference measurement package $RP_n$.

In means 62 accordance measures or distance values $acc_k$ are determined, for example, according to the above-described equations (1) or (2). I.e., using means 62, first of all those reference packages $RP_n$ (n=1, 2, . . . N; N≧1) are determined from the reference database 14 which best match the current measurement package MP(i). According to one embodiment of the present invention, the estimate o'(i) may be determined for the current orientation by giving back the reference orientation of the reference package having the lowest acc value as an estimate o'(i).

Further, the estimated orientation o'(i) may be executed over an amount of suitable or matching reference package candidates by a weighted orientation averaging. This amount of matching reference package candidates includes not all the reference packages considered in the matching phase, but only those which fulfil certain preconditions. One inventive method for selecting suitable reference measurement packages is to be explained in more detail in the following with reference to FIG. 7.

In a first step 71 the current measurement package MP(i) is received by means of the transmit/receive means 10. Further, the number n of measurement packages coming into question for the weighted averaging is initialized by 0 and a value (e.g. 10 dB) is allocated to a maximum admissible distance value $acc_{th}$. In a subsequent step 72, an accordance measure $acc_k$ is determined between the current measurement package MP(i) and a reference package $RP_k$ from the reference database 14 according to equations (1) or (2). In a third step 73, it is checked whether the distance value $acc_k$ determined in step 72 is smaller than the maximum admissible distance value $acc_{th}$. If this is not the case, it is checked in a step 74 whether all K (relevant) reference packages of the reference database have already been considered. If this is not the case, k is incremented by 1 (step 75) and the next reference package $RP_k$ is taken from the reference database 14 and supplied to step 72.

If the comparison in step 73 shows, however, that the distance value $acc_k$ determined in step 72 is below the maximum admissible distance value $acc_{th}$, a comparison is executed in a step 76 as to whether the distance value $acc_k$ determined in step 72 is below a variable $acc_{max}$ depending on a hitherto best distance value $acc_0$, wherein at the beginning $acc_{max}$ may be selected equal to $acc_{th}$. If this is the case, the reference package $RP_k$ is allocated to the amount of matching reference package candidates. If $acc_k$ is greater than $acc_{max}$, which may only be the case from the second pass of the loop illustrated in FIG. 7, the process continues with step 74.

After the reference package $RP_k$ has been allocated to the amount of matching RP candidates in step 77, it is checked in a subsequent step 78 whether the distance value $acc_k$ is below the hitherto best distance value $acc_0$. If this is the case, $acc_k$ is now the best distance value $acc_0$ (step 79). If this is not the case, the process continues with step 74.

When, in this way, all the reference packages from the reference database 14 have been compared to the current measurement package, i.e. k=K, in a step 80 the orientation estimation takes place based on the N selected measurement packages or their associated orientation information $o_n$ (n=1, 2, ... N; N≧1). This happens in means 66.

In summary, according to one embodiment, the selection of the matching RP candidates takes place based on the following criteria:

$acc_k \leq acc_{max}$ AND $acc_k \leq acc_{th}$, $acc_{max} = acc_0 * LIMIT$.

Here, $acc_{max}$ is a variable determined depending on the best distance or accordance measure $acc_0$. $acc_0$ is to be referred to as the first reference accordance measure in the following. The means 64 for selecting is thus adapted, according to embodiments, to select the at least one reference measurement package $RP_n$ such that its accordance measure $acc_n$ does not deviate by more than a predetermined value from the first reference accordance measure $acc_0$ of a reference measurement package $RP_0$ which has a highest accordance with the current measurement package MP(i). The predetermined deviation value may be determined according to (LIMIT−1)*$acc_0$. LIMIT may here be selected suitably, for example 1.0≦LIMIT≦1.5. $acc_{th}$ is the maximum admissible distance or accordance value and may, e.g., be in a range from 5 dB≦$acc_{th}$≦20 dB. In the following, $acc_{th}$ is to be referred to as the second reference accordance measure. Means 64 for selecting may thus be implemented to select a reference measurement package $RP_n$ which comprises a determined accordance measure $acc_n$ which is additionally located below the second reference accordance measure $acc_{th}$ which represents a needed minimum accordance of a reference measurement package with the current measurement package MP(i). The areas indicated here are only an example. In practice, they depend on the used radio technology, topography, movement speed, etc.

In order to achieve for a selected reference package $RP_n$ (n=1, 2, ... N; N≧1) with a low ace value or an orientation $o_n$ (n=1, 2, ... N; N≧1) associated with the same to acquire a higher weight in the orientation estimation, the corresponding weight according to one embodiment is selected inversely proportional to the ace value. I.e., the means 66 for determining the estimate o'(i) is adapted to select the weight of a reference orientation $o_n$ (n=1, 2, ... N; N≧1) corresponding to a selected reference package inversely proportional to the accordance measure $acc_n$ (n=1, 2, ... N; N≧1) allocated to the reference orientation. The weight $w_n$ may be selected according to $$w_n = \frac{1}{acc_n^{norm}} \quad (3)$$

wherein norm may, for example, be selected in a range 1≦norm≦4.

According to another embodiment, the means 66 for determining the estimate $o'_{(i)}$ is adapted to select the weight $w_n$ (n=1, 2, ... N; N≧1) of a corresponding reference orientation $o_n$ (n=1, 2, ... N; N≧1) indirectly or inversely proportional to a difference between the accordance measure $acc_n$ associated with the corresponding reference orientation $o_n$ (n=1, 2, ... N; N≧1) and the first reference accordance measure $acc_0$. I.e., for example, a weight is selected according to $$w_n = \frac{1}{(acc_n - acc_0 + 1)^{norm}}. \quad (4)$$

Here, norm may, for example, be selected in a range 1≦norm≦4. Here, a normalization to the acc value $acc_1$ of the best matching result is executed to achieve a higher differentiability.

The estimate o'(i) for the current orientation of the mobile terminal device may then, e.g., be calculated according to $$o'(i) = \frac{1}{\sum_{n=1}^{N} w_n} \cdot \sum_{n=1}^{N} w_n \cdot o_n. \quad (5)$$

Figure 8:
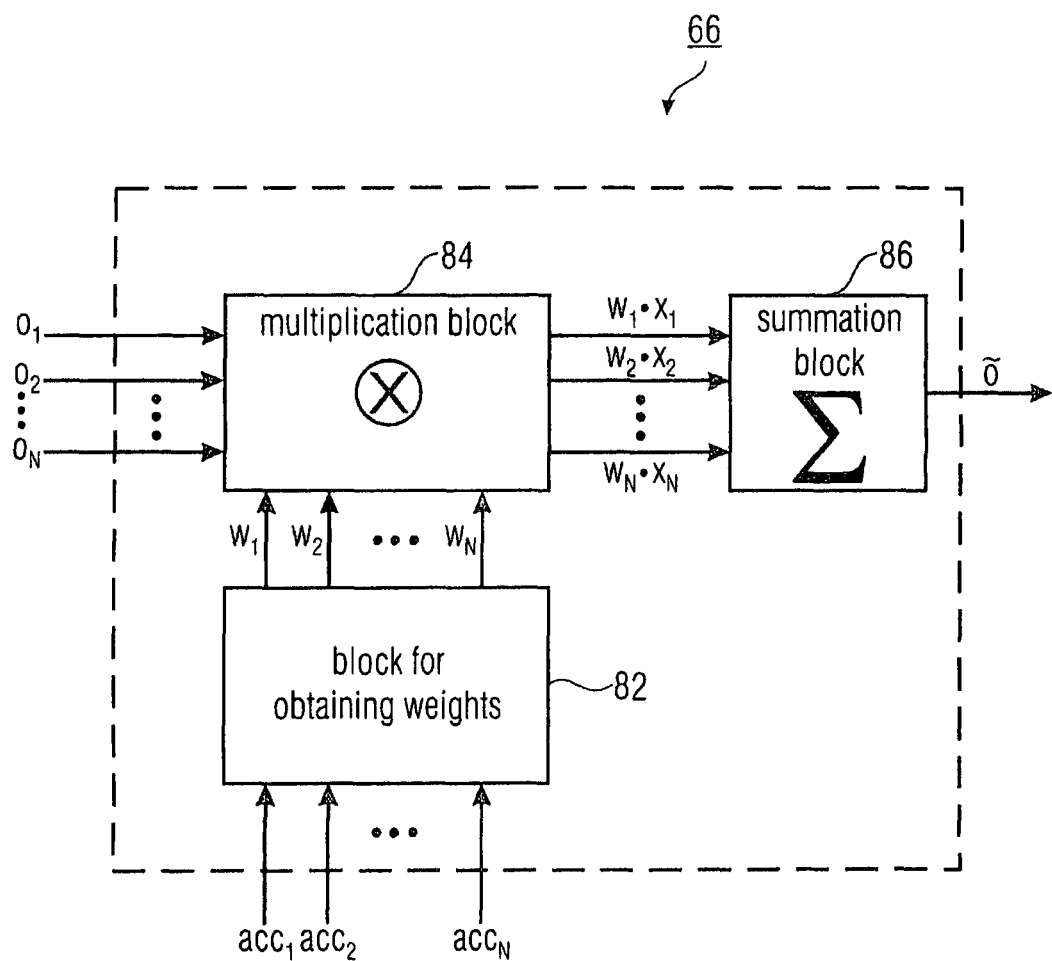
FIG. 8 is an illustration of a means for determining an estimate for the current orientation of the mobile terminal device according to an embodiment of the present invention.

A block diagram of means 66 for determining the estimate o'(i) for the current orientation of the mobile terminal device based on reference orientations $o_n$ of the selected reference measurement packages $RP_n$ (n=1, 2, ... N; N≧1) is illustrated in FIG. 8.

$acc_n$ (n=1, 2, ... N; N≧1) coming from means 62 for determining at least one accordance measure or differential value are processed in a block 82, so that on the output side of this block 82 the weights $w_n$ (n=1, 2, ... N; N≧1) are obtained. Each of the weights $w_n$ is multiplied in a block 84 by its corresponding reference orientation $o_n$ (n=1, 2, ... N; N≧1). The result is then supplied to a summation block 86 to obtain the estimate o'(i) for the current orientation of the mobile terminal device on the output side.

Figure 9:
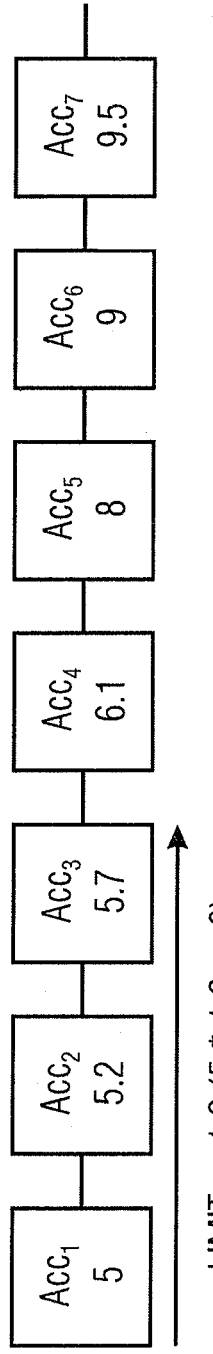
FIG. 9 is an illustration of a number example for determining an orientation estimate.
Figure 9:
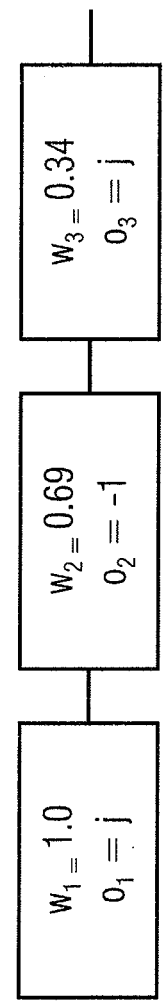

With reference to FIG. 9, finally a sample calculation for explaining the inventive concept is to be given.

FIG. 9a shows a series of matching results in an ascending order, i.e. determined distance values $acc_k$ between a current measurement package and different reference packages. As an example, the best distance value $acc_0$ of the reference package with the highest matching with the current measurement package comprises a value of 5 dB. This first reference value $acc_0$ is now multiplied by a value LIMIT=1.2 to obtain a value $acc_{max}$=6. As only those reference packages were selected as candidates whose distance values fulfil the condition $acc_k \leq acc_{max}$, only the reference packages according to the first three acc values are selected.

From the first acc value $acc_1$=5 dB, a weight $w_1$=1 results using equation (4). The corresponding reference orientation $o_1$=j (with $j^2$=1, j according to north, or 0°, for example) is now weighted with this weight $w_1$. For $acc_2$=5.2, a weight of $w_2$=0.69 results. The associated reference orientation $o_2$=−1 (e.g. according to west, or 270°) is weighted with this weight. For $acc_3$=5.7, a weight $w_3$ of 0.34 results. This value is multiplied by the corresponding reference orientation $o_3$=j, and finally the three weighted reference orientations are summed up so that a value of o'(i)=1/2.03*(j−0.69+0.34j)=−0.34+0.66j results. From this, the orientation may be determined to be approx. 300°, which may also be interpreted as north-north-west.

If the result of an inventive orientation estimation is, for example, to allow all values between 0 and 360°, reference points of at least three different orientations (0°, 120°, 240°) are needed at one location for a weighted averaging illustrated as an example here. Often, it is sufficient, however, to have only two possible orientations. This is, for example, the case when moving along a street. It is a different matter in larger open spaces, for example large squares, exhibition halls, crossroads, etc.

Numerous applications are possible where it is sensible, apart from a position, to obtain an orientation as well. This refers to the orientation of a user with respect to compass directions, but also the relative orientation with respect to a property or inside a building. In this respect, the means 44 for detecting the actual orientation is adapted to detect the actual orientation in a reference coordinate system, wherein the reference coordinate system comprises a reference point of a building, like, e.g., a corner point of a building, as a coordinate origin. Embodiments of the present invention may, for example, be integrated in a guiding or information system which is available in the inner-city area and enables a high position determination accuracy there.

The terminal devices in which the inventive method may be executed are thus not limited to the already mentioned PDAs or mobile telephones. Rather, any other terminal devices provided with transmit and receive means are possible. This may, for example, be digital cameras, car radios or other components built into automobiles or motorcycles or the like.

Depending on the circumstances, the inventive methods may be implemented in hardware or in software. The implementation may take place on a digital storage medium, in particular a floppy disc or a CD having electronically readable control signals which may cooperate with a programmable computer system so that the inventive methods are executed. In general, the invention thus also consists in a computer program product having a program code stored on a machine-readable carrier for executing the inventive method when the computer program product is executed on a computer. In other words, the invention may thus be realized as a computer program having a program code for executing the method, when the computer program is executed on a computer or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:

a determiner for determining an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;

a selector for selecting at least one reference measurement package comprising an accordance measure; and a determiner for determining an estimate for the current orientation of the mobile terminal device based on the reference orientation of the at least one selected reference measurement package.

2. The device according to claim 1, wherein the selector for selecting is adapted to select the at least one reference measurement package such that its accordance measure does not deviate by more than a predetermined value from a first reference accordance measure of a reference measurement package which comprises a highest accordance with the current measurement package.

3. The device according to claim 2, wherein the selector for selecting is implemented to select a reference measurement package comprising a determined accordance measure additionally lying below a second reference accordance measure representing a needed minimum accordance of a reference measurement package with the current measurement package.

4. The device according to claim 1, wherein the determiner for determining the estimate is adapted to determine the estimate based on a weighted sum of selected reference measurement packages corresponding to reference orientations, wherein a weight of a reference orientation depends on the accordance measure determined with respect to the corresponding reference measurement package.

5. The device according to claim 4, wherein the determiner for determining the estimate is adapted to select the weight of a corresponding reference orientation inversely proportional to the accordance measure associated with the reference orientation.

6. The device according to claim 4, wherein the determiner for determining the estimate is adapted to select the weight of a corresponding reference orientation inversely proportional to a difference between the accordance measure associated with the corresponding reference orientation and the first reference accordance measure.

7. The device according to claim 1, wherein the determiner for determining the accordance measure is implemented to determine the accordance measure based on differences between the electromagnetic signal characteristics of the reference measurement package and the electromagnetic signal characteristics of the current measurement package.

8. The device according to claim 7, wherein the differences between electromagnetic signal characteristics are formed by radio transmitters comprised both in the current measurement package and also in the reference measurement package.

9. The device according to claim 7, wherein the determiner for determining the accordance measure is implemented to allocate a smaller accordance measure to the reference measurement package, the smaller a sum of the differences is.

10. The device according to claim 1, comprising, for determining the current measurement package, an antenna unit with an antenna directional characteristic, and wherein the orientation of the mobile terminal device is defined by a spatial orientation of the main lobe of the antenna directional characteristic.

11. The device according to claim 1, wherein the electromagnetic signal characteristics are signal characteristics of radio signals related to a receive field strength.

12. The device according to claim 11, wherein an electromagnetic signal characteristic is an RSSI value, a receive power spectrum or a signal-to-noise power ratio.

13. The device according to claim 1, wherein the device is implemented in a WLAN-capable terminal device.

14. A method for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:

- determining, by an accordance measure determiner, an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;
- selecting, by a selector, at least one reference measurement package comprising an accordance measure; and
- determining, by an estimate determiner, an estimate for the current orientation of the mobile terminal device based on the reference orientation of the at least one selected reference measurement package,
- wherein at least one of the accordance measure determiner, the selector, and the estimate determiner comprises a hardware implementation.

15. A non-transitory storage medium having stored thereon a computer program for executing the method for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:

- determining an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;
- selecting at least one reference measurement package comprising an accordance measure; and
- determining an estimate for the current orientation of the mobile terminal device based on the reference orientation of the at least one selected reference measurement package,
- when the computer program is executed on a computer or microcontroller.

16. A device for storing a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:

- a detector for detecting the current orientation, wherein the detector for detecting the current orientation is formed according to the device for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, the device for estimating comprising:
- a determiner for determining an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;
- a selector for selecting at least one reference measurement package comprising an accordance measure; and
- a determiner for determining an estimate for the current orientation of the mobile terminal device based on the reference orientation of the at least one selected reference measurement package; and
- a storage for storing the detected current orientation together with the determined measurement package in a reference database.

17. The device according to claim 16, further comprising a determiner for determining the current geographical position and wherein the storage for storing is adapted to store the detected current orientation together with the determined measurement package and the determined current position as a reference package in the reference database.

18. The device according to claim 16, wherein the detector for detecting is adapted to detect the current orientation in a reference coordinate system, wherein the reference coordinate system comprises a reference point of a building as a coordinate origin.

19. The device according to claim 16, which comprises, for determining the current measurement package, an antenna unit with an antenna directional characteristic and wherein the orientation of the mobile terminal device is defined by a spatial alignment of the main lobe of the antenna directional characteristic.

20. The device according to claim 16, wherein the storage for storing is adapted to store the detected current orientation in a quantized, digital format.

21. A method for storing a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:

- detecting, by a detector, the current orientation using a method for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, the method comprising:
- determining, by an accordance measure determiner, an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;
- selecting, by a selector, at least one reference measurement package comprising an accordance measure; and
- determining, by an estimate determiner, an estimate for the current orientation of the mobile terminal device based on the reference orientation of the at least one selected reference measurement package; and
- storing, by a storage medium, the detected current orientation together with the determined measurement package in a reference database wherein at least one of the detector, the accordance measure determiner, the selector, the estimate determiner, and the storage medium comprises a hardware implementation.

22. A non-transitory storage medium having stored thereon a computer program for executing the method for storing a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, comprising:
- detecting the current orientation using a method for estimating a current orientation of a mobile terminal device at a current geographical position, wherein, at the current geographical position, a current measurement package may be determined which comprises a transmitter identification and an electromagnetic signal characteristic of a radio transmitter which may be received at the current geographical position with the current orientation of the mobile terminal device at a current measurement time, the method comprising:
  - determining an accordance measure between the current measurement package and a reference measurement package comprising a transmitter identification, a reference orientation and an electromagnetic signal characteristic of a reference radio transmitter which was receivable at a geographical reference position associated with the reference measurement package with the reference orientation at a reference time lying before the current measurement time;
  - selecting at least one reference measurement package comprising an accordance measure; and
  - determining an estimate for the current orientation of the mobile terminal device based on the reference orientation of the at least one selected reference measurement package; and
- storing the detected current orientation together with the determined measurement package in a reference database.

* * * * *